(12) United States Patent
Forstadius (10) Patent No.: US 8,209,411 B2
(45) Date of Patent: *Jun. 26, 2012

(54) SYSTEM, METHOD AND COMPUTER PROGRAM PRODUCT FOR PROVIDING CONTENT TO A TERMINAL

(75) Inventor: Antti Forstadius, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,642

(22) Filed: Jul. 21, 2009

(65) Prior Publication Data

US 2010/0017468 A1    Jan. 21, 2010

Related U.S. Application Data

(63) Continuation of application No. 10/861,595, filed on Jun. 4, 2004, now Pat. No. 7,584,244.

(51) Int. Cl.
*G06F 15/173* (2006.01)

(52) U.S. Cl. ........ 709/223; 709/203; 709/217; 709/227; 455/414.2

(58) Field of Classification Search .................. 709/203, 709/217, 219, 223, 227; 455/414.2
See application file for complete search history.

(56) References Cited

U.S. PATENT DOCUMENTS

| | | | |
|---|---|---|---|
| 5,337,412 A | | 8/1994 | Baker et al. |
| 6,320,595 B1 | | 11/2001 | Simons et al. |
| 6,624,769 B2 | | 9/2003 | Oktem et al. |
| 6,955,298 B2 * | | 10/2005 | Herle .................. 235/472.01 |
| 6,992,782 B1 | | 1/2006 | Yardumian et al. |
| 7,016,062 B2 * | | 3/2006 | Ishizuka .................. 358/1.15 |
| 7,020,685 B1 * | | 3/2006 | Chen et al. .................. 709/204 |
| 7,149,981 B1 * | | 12/2006 | Lundy et al. .................. 715/767 |
| 7,155,517 B1 * | | 12/2006 | Koponen et al. .................. 709/227 |
| 7,191,216 B2 * | | 3/2007 | Mattila et al. .................. 709/205 |
| 7,210,099 B2 * | | 4/2007 | Rohrabaugh et al. ......... 715/249 |
| 7,266,611 B2 * | | 9/2007 | Jabri et al. .................. 709/231 |

(Continued)

FOREIGN PATENT DOCUMENTS

CN        1131860 A        9/1996

(Continued)

OTHER PUBLICATIONS

Chinese Office Action for corresponding Chinese Application No. 200580017870.9, Jul. 3, 2009, pp. 1-8.

(Continued)

*Primary Examiner* — Lashonda Jacobs
(74) *Attorney, Agent, or Firm* — Ditthavong Mori & Steiner, P.C.

(57) ABSTRACT

A system for providing content to a mobile terminal includes a source and a messaging gateway. The source is capable of reformatting content intended for receipt by a terminal, and transferring the reformatted content and an address of the terminal to the messaging gateway. The content can be reformatted in any of a number of different manners, including for example, a vectorized format such as the scalable vector graphics (SVG) format. In response to receiving the reformatted content and address of the terminal, the messaging gateway is capable of signaling the terminal, the signaling including information required to access the reformatted content. As such, the terminal can thereafter send a request to the messaging gateway in response to the messaging gateway signaling the destination client, and thereafter download the reformatted content from the messaging gateway, such as at least partially across a cellular network.

20 Claims, 7 Drawing Sheets

U.S. PATENT DOCUMENTS

| | | | | |
|---|---|---|---|---|
| 7,430,602 | B2* | 9/2008 | Babbar et al. | 709/227 |
| 7,502,344 | B2* | 3/2009 | Matsumoto | 370/328 |
| 2001/0055285 | A1* | 12/2001 | Tomoike | 370/328 |
| 2002/0091738 | A1 | 7/2002 | Rohrabaugh et al. | |
| 2002/0128003 | A1* | 9/2002 | Gruner et al. | 455/422 |
| 2004/0030930 | A1* | 2/2004 | Nomura | 713/201 |
| 2004/0048602 | A1* | 3/2004 | Tamura | 455/412.1 |
| 2005/0220139 | A1* | 10/2005 | Aholainen | 370/466 |
| 2006/0242664 | A1* | 10/2006 | Kikkawa et al. | 725/37 |
| 2007/0061395 | A1* | 3/2007 | Choi et al. | 709/203 |
| 2008/0147842 | A1* | 6/2008 | Mohri et al. | 709/223 |

FOREIGN PATENT DOCUMENTS

| | | |
|---|---|---|
| CN | 1291853 A | 4/2001 |
| WO | WO 03/003190 | 1/2003 |
| WO | WO 03/003297 | 1/2003 |
| WO | WO 03/043301 | 5/2003 |

OTHER PUBLICATIONS

Chinese Office Action for corresponding Chinese Application No. 200580017870.9, Apr. 26, 2010, pp. 1-38.

Chinese Office Action for corresponding Chinese Application No. 200580017870.9, Nov. 7, 2008, pp. 1-53.

Chinese Office Action for corresponding Chinese Application No. 200580017870.9, Nov. 27, 2009, pp. 1-8.

RepliGo Products; Cerience Corporation; 2 pages; available at <http://www.cerience.com/products/index.htm> (visited Apr. 23, 2004).

SVGmaker—The SVG Printer Driver; 3 pages; available at <http://www.svgmaker.com/index/htm> (visited Apr. 23, 2004).

SVG Printing Requirements—W3C Working Draft Feb. 18, 2003; 9 pages; available at <http://missors.webthing.com/view=Betsie/www.w3.org/TR/SVGPrintReqs/> (visited Apr. 23, 2004).

Mobile SVG Profiles: SVG Tiny and SVG Basic, Version1.2—W3C Working Draft Mar. 25, 2004; 33 pages; available at <http://mirrors.webthing.com/view=Betsie/www.w3.org/TR/SVGMobile 12/> (visited Apr. 23, 2004).

SVG Implementations—SVG Viewers; W3C Document Formats domain; 19 Pages; available at <http://www.w3.org/Graphics/SVG/SVG-Implementations> (visited Apr. 23, 2004).

RepliGo for Nokia series 60 User Guide; Cerience Corporation; 27 pages; available at <http://www.cerience.com/docs/S60/docs/index.htm> (visited Apr. 23, 2004).

BitFlash™—Solutions; BitFlash™ Mobile document viewing; 2001; 4 pages; available at <http://www.bitflash.com/solutions/mobile_document.asp> (visited Apr. 22, 2004).

BitFlash™—Products; BitFlash™ Document Transcoder; 2001; 1 page; available at <http://www.bitflash.com/products/transcoder.asp> (visited Apr. 22, 2004).

Sharp and BitFlash Announce Mobile SVG; MobileMag.com > Mobile Phones; Dec. 2003; available at <http://www.mobilemag.com/content/100/340/C2294/> (visited Apr. 22, 2004).

New App Idea: Print to Mobile; Russell Beattie Notebook; Jan. 2, 2004; 5 pages; available at <http://www.hri.org/cgi-bin/2ascii?http%3A//www.russellbeattie.com%3A80/notebook/100> (visited Apr. 23, 2004).

Chinese Office Action for corresponding Chinese Application No. 200580017870.9, Apr. 26, 2010, pp. 1-38

Chinese Office Action for corresponding Chinese Application No. 200580017870.9, Nov. 7, 2008, pp 1-53.

International Search Report and Written Opinion for corresponding International App. No. PCT/IB2005/001542 dated Oct. 27, 2010, pp. 1-11.

* cited by examiner

SYSTEM, METHOD AND COMPUTER PROGRAM PRODUCT FOR PROVIDING CONTENT TO A TERMINAL

CROSS REFERENCE TO RELATED APPLICATIONS

This application is a continuation of U.S. patent application Ser. No. 10/861,595, filed Jun. 4, 2004 now U.S. Pat. No. 7,584,244, which is hereby incorporated herein in its entirety by reference.

FIELD OF THE INVENTION

The present invention generally relates to systems and methods of providing content to a terminal and, more particularly, relates to systems and methods of providing content to a terminal having a limited display area for presenting such content.

BACKGROUND OF THE INVENTION

Today's business environment is increasingly dependent on information sharing as the basis for planning and decision making. Although communication can be solely verbal, its efficiency increases significantly when other modes of communication, such as visual information, are used concurrently. Visual information can be effectively used to augment verbal information and to improve the clarity and structure of the verbal communication. In the corporate environment, communication is extensively based on augmenting verbal/textual communication with visual information, e.g., in the form of e-mail attachments, printed matter and Powerpoint® presentations. Also, application sharing and workspace sharing (e.g., Microsoft Messenger®, Netmeeting®, Opentext OpenView®, etc.) are widely used in desktop conferencing for sharing material between participants.

Although images, data or other value-added information can be readily shared on computers within the corporate network, this information is generally not accessible to users who are out of the office or do not have access to their personal computers. Typically, when an employee is away from the office, he can still communicate verbally using his mobile phone, but he can not share any visual information with the calling party, which could otherwise be used to augment the voice call and add value to the conversation. Accessing such material would generally require the user to first connect to the corporate network or mail server with his laptop to retrieve and view the material. This is very impractical, however, since it would require the person to have a personal computer and wireless/wireline access to a data network, and further require him to set up the computer, log into the network and finally find and download the relevant material typically over a low bandwidth connection.

If the user has a mobile terminal such as a "smartphone" or a Communicator-type of device, the device can also be used to access additional data over e-mail in e-mail attachments. However, downloading e-mail attachments can be time consuming and expensive, since normal application files—such as Powerpoint files, images, etc.—are not optimized for mobile delivery and use, and therefore can be relatively large, thus resulting in long download times. Viewing e-mail attachments also requires that the user's mobile terminal be equipped with suitable viewing applications, which support the received application data type and version.

As can be seen from the foregoing, the present solutions for augmenting voice calls with images, data or other value added information, disadvantageously involve many pre-requisites—such as having a laptop, modem access or pre-installed viewing applications—and many phases for setting up a data connection and downloading the information. For these reasons, mobile users unfortunately have had to rely on using voice communication only or, alternatively, have had to go through the extensive and time consuming process of downloading material using a modem and laptop.

Further, images, data or other value added information are often created for rendering on a target platform, the target platform often having reasonable storage capacity, memory, bandwidth, and a large (typically at least 14-inch diagonal) display. Thus, since mobile terminals may have limited display area, resolution, and rendering capabilities, the mobile terminal may be unable to render such content as originally designed, or the mobile terminal may render the content in an extremely slow and/or inconvenient manner. Internet-enabled mobile phones, for instance, typically can display only a few lines of text, while their ability to render images may be confined to grayscale or thumbnail-sized images, or no images at all. An extreme example of a display-constrained medium is voice. In this regard, systems, such as AT&T Natural Voices™ Text-to-Speech Engine, allow users to access electronic documents by telephone, by dialing in to a service that uses text-to-speech conversion to dictate the contents of the documents over the phone. Dictation is necessarily a one-dimensional "rendering" of text, however, and cannot express the complex layout information embedded in a two-dimensional table.

Conventionally, devices are unable to render such documents as they were originally designed due to limited screen size, resolution, and rendering capabilities take liberties when called upon to render such documents. In this regard, many Internet-enabled mobile devices restrict the maximum size of a document that they can render. For instance, most Internet-enabled phones that comply with the WAP (Wireless Application Protocol) standard only support documents less than or equal to 2000 bytes. Even for those mobile devices (e.g., Pocket PC's and palm-based computers) that do not impose a strict size limit on documents, large source documents are typically broken into smaller parts because transmitting long documents at once over slow wireless networks can try the patience of users.

SUMMARY OF THE INVENTION

In light of the foregoing background, embodiments of the present invention provide an improved system, method and computer program product for providing content from a fixed network, typically, personal computer (PC), environment to a destination, such as a mobile terminal, operating in a different network and computing platform. In accordance with embodiments of the present invention, content is capable of being reformatted into a scalable digital printout by means of a printing interface of a source, such as a personal computer, before being provided to a destination, such as a terminal. The digital printout can then be provided from the source to the destination through a messaging gateway for rendering by the destination, such as by a display. Before providing the digital printout, however, the messaging gateway can signal the destination based upon an address of the destination to thereby notify the destination of the availability of content intended for the destination. The destination can thereafter connect to the messaging gateway to download the content from the messaging gateway, where the messaging gateway can ensures secure content delivery through authentication and through secure connectivity.

According to one aspect of the present invention, a system is presented for providing content to a mobile terminal capable of operating in a cellular network environment. The system includes a source and a messaging gateway. The source is capable of reformatting content intended for receipt by the terminal, the content reformatted into a vectorized format. In this regard, the source can be capable of operating a source client. In such instances, the source client can be capable of receiving the content by interfacing with the print functionality of another application capable of operating on the source. Additionally or alternatively, the source client can be capable of receiving the content by interfacing with a Graphics Device Interface (GDI) of an operating system capable of operating on the source.

The content can be reformatted in any of a number of different manners, including for example, the scalable vector graphics (SVG) format. Alternatively, the content can be reformatted into an intermediate format (e.g. PostScript format), with the messaging gateway thereafter reformatting the content from the intermediate format into a vectorized format supported by the mobile terminal. Irrespective of how the source reformats the content, the source can receive the mobile terminal address (e.g., mobile telephone number, Session Initiation Protocol (SIP) address, etc.) in any of a number of different manners, such as from a source user. Alternatively, for example, the source can be capable of receiving a name of a mobile terminal user, and thereafter selecting the mobile terminal address based upon the name.

After reformatting the content, the source can transfer the reformatted content, an address of the terminal, and possibly a text message, to the messaging gateway. In response to receiving the reformatted content and address of the terminal, the messaging gateway is capable of signaling the mobile terminal, the signaling including information required to access the reformatted content. In this regard, the messaging gateway can be capable of signaling the mobile terminal at least partially across a cellular network, such as in accordance with the Short Messaging Service (SMS) or Session Initiation Protocol (SIP).

As will be appreciated, the messaging gateway is capable of signaling the mobile terminal such that the messaging gateway is further capable of facilitating downloading or transferring of the reformatted content to the mobile terminal in response to receiving a request from the mobile terminal, the request being in response to the messaging gateway the signaling of the mobile terminal. For example, the mobile terminal can be configured to thereafter connect to the messaging gateway to download the reformatted content in response to the signaling of the mobile terminal. Before downloading the reformatted content, however, the messaging gateway can be capable of authenticating the mobile terminal based upon an identity of the mobile terminal. More particularly, for example, the messaging gateway can be capable of authenticating the mobile terminal based upon an international mobile equipment identification (IMEI) code associated with the mobile terminal, and/or a session authentication key transferred to the mobile terminal during the signaling of the mobile terminal.

After receiving the reformatted content, the messaging gateway can be capable of storing the reformatted content in memory of the messaging gateway. Thereafter, upon transferring of the reformatted content to, or otherwise downloading of the reformatted content by, the mobile terminal, the messaging gateway can be capable of removing the reformatted content from the memory.

In one typical embodiment, the source can be capable of transferring the reformatted content and the address of the terminal at least partially across an Internet Protocol (IP) network. Then, in turn, the messaging gateway can be capable of signaling the mobile terminal across a cellular network, the signaling including information permitting the terminal to thereafter download the reformatted content at least partially across the cellular network.

A source, messaging gateway, terminal, method and computer program product for providing content to a terminal are also provided. Embodiments of the present invention therefore provide a system, method and computer program product for providing content to a terminal. The system, source, messaging gateway, terminal, method and computer program product of embodiments of the present invention are capable of reformatting content into a scalable digital printout by means of a printing interface of the source. The digital printout and an address of the destination terminal can then be provided to a messaging gateway. By providing the address of the terminal, the messaging gateway can signal (e.g., using the cellular network and its services) to the destination based upon the address (e.g., mobile telephone number, SIP address, etc.). In response to the signaling of the terminal, then, the terminal can download the content from the messaging gateway. As such, the system, source, messaging gateway, terminal, method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
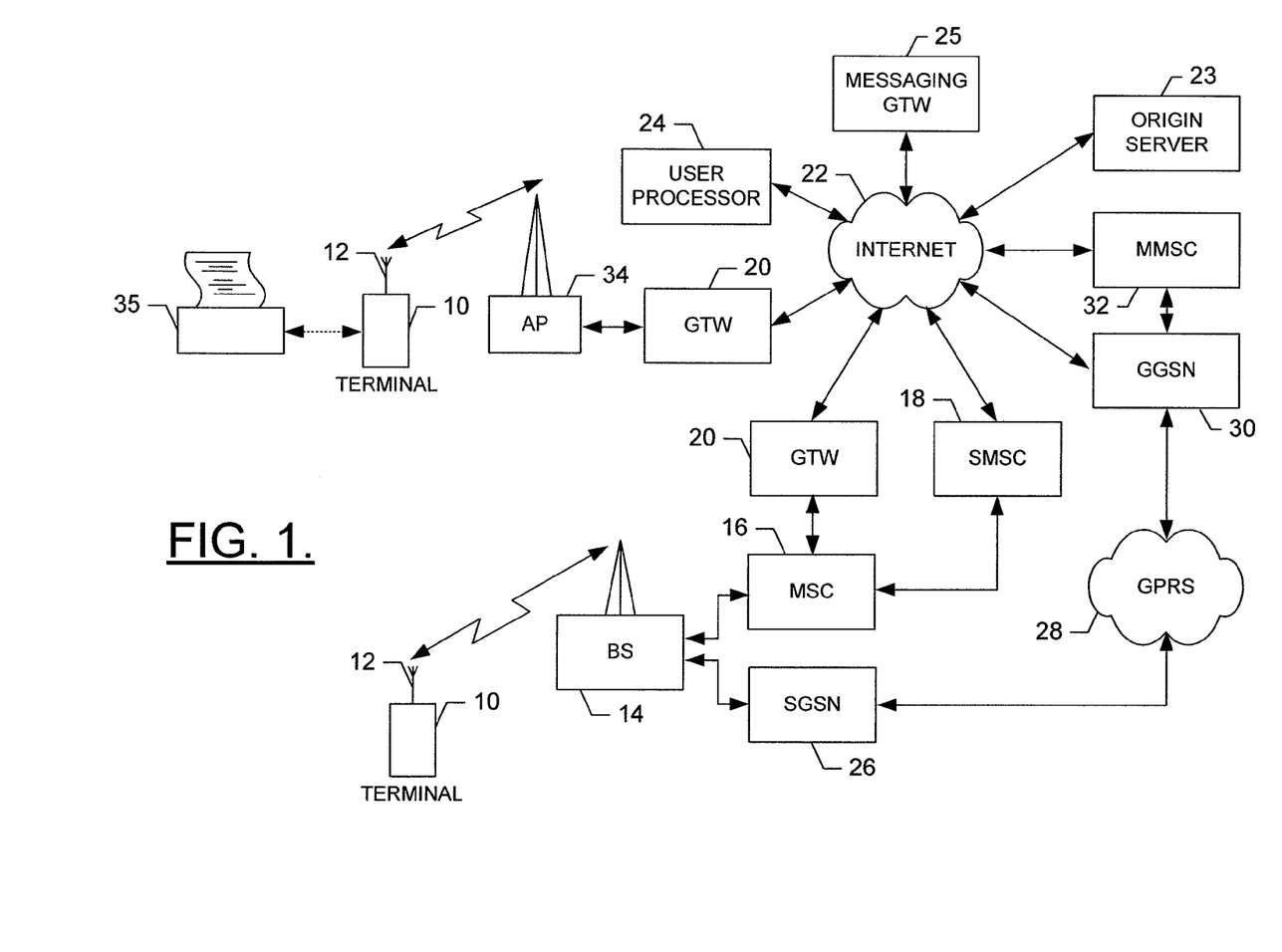
FIG. 1 is a block diagram of one type of terminal and system that would benefit from embodiments of the present invention.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of one or more cellular or mobile networks that each include elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center, such as short messaging service (SMS) messages to and from a SMS center (SMSC) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with an origin server 23, a user processor 24, messaging GTW 25 or the like, one of each being illustrated in FIG. 1 and described below.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 20. Also, the GGSN can be coupled to a messaging center, such as a multimedia messaging service (MMS) center 32. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 26 to the GPRS core network 28 and the GGSN 30, devices such as a user processor 24 and/or messaging GTW 25 can be coupled to the terminal 10 via the Internet 22, SGSN and GGSN. In this regard, devices such as an user processor and/or messaging GTW can communicate with the terminal across the SGSN, GPRS and GGSN. By directly or indirectly connecting the terminals and the other devices (e.g., user processor, messaging GTW, etc.) to the Internet, the terminals can communicate with the other devices and with one another, such as according to the Hypertext Transfer Protocol (HTTP), to thereby carry out various functions of the terminal.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 34. The APs can comprise access points configured to communicate with the terminal in accordance with techniques such as, for example, radio frequency (RF), Bluetooth (BT), infrared (IrDA) or any of a number of different wireless networking techniques, including WLAN techniques. The APs 34 may be coupled to the Internet 22. Like with the MSC 16, the APs can be directly coupled to the Internet. In one embodiment, however, the APs are indirectly coupled to the Internet via a GTW 20. As will be appreciated, by directly or indirectly connecting the terminals and the user processor 24, messaging GTW 25, and/or any of a number of other devices, to the Internet, the terminals can communicate with one another, the user processor, etc., to thereby carry out various functions of the terminal, such as to transmit data, content or the like to, and/or receive content, data or the like from, the user processor. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the terminal 10 to user processors 24 across the Internet 22, the terminal and user processor can be coupled to one another and communicate in accordance with, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal. Further, the terminal 10 can be coupled to one or more electronic devices 35, such as printers, digital projectors and/or other multimedia capturing, producing and/or storing devices (e.g., other terminals). Like with the user processors 24, the terminal can be configured to communicate with the portable electronic devices in accordance with techniques such as, for example, RF, BT, IrDA or any of a number of different wireline or wireless communication techniques, including USB, LAN and/or WLAN techniques.

Figure 2:
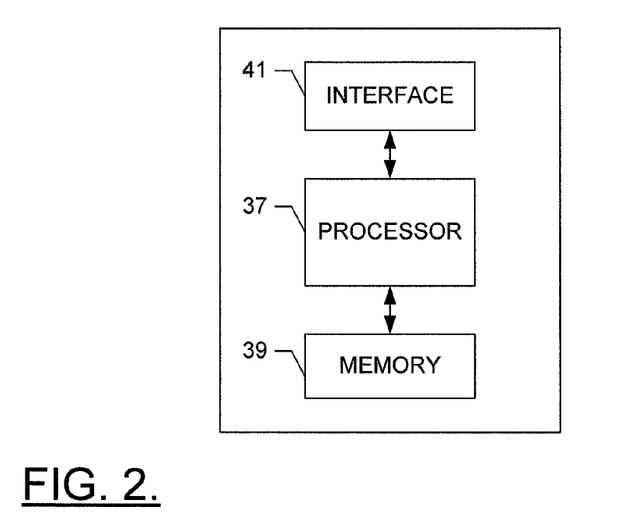
FIG. 2 is a schematic block diagram of an entity capable of operating as a terminal, origin server, user processor and/or messaging gateway, in accordance with embodiments of the present invention.

Referring now to FIG. 2, a block diagram of an entity capable of operating as a terminal 10, origin server 23, user processor 24 and/or messaging gateway 25, is shown in accordance with one embodiment of the present invention. Although shown as separate entities, in some embodiments, one or more entities may support one or more of a terminal, origin server, messaging gateway and/or user processor, logically separated but co-located within the entit(ies). For example, a single entity may support a logically separate, but co-located, user processor and messaging gateway. Also, for example, a single entity may support a logically separate, but co-located terminal and user processor.

As shown, the entity capable of operating as a terminal 10, origin server 23, user processor 24 and/or messaging gateway 25 can generally include a processor 37 connected to a memory 39. The processor can also be connected to at least one interface 41 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. In addition, when the entity comprises a messaging gateway, the memory can store one or more databases. For example, the memory of a messaging gateway can store a transaction database storing reformatted content from one or more sources of such content, and associating the reformatted content with a destination address and a session authentication key, as explained below. As also explained below, the memory of a messaging gateway can also store a terminal database storing the addresses of one or more destinations, such as those registered with the messaging gateway, associating the addresses with one or more other identifiers of the destination(s), if so desired.

Figure 3:
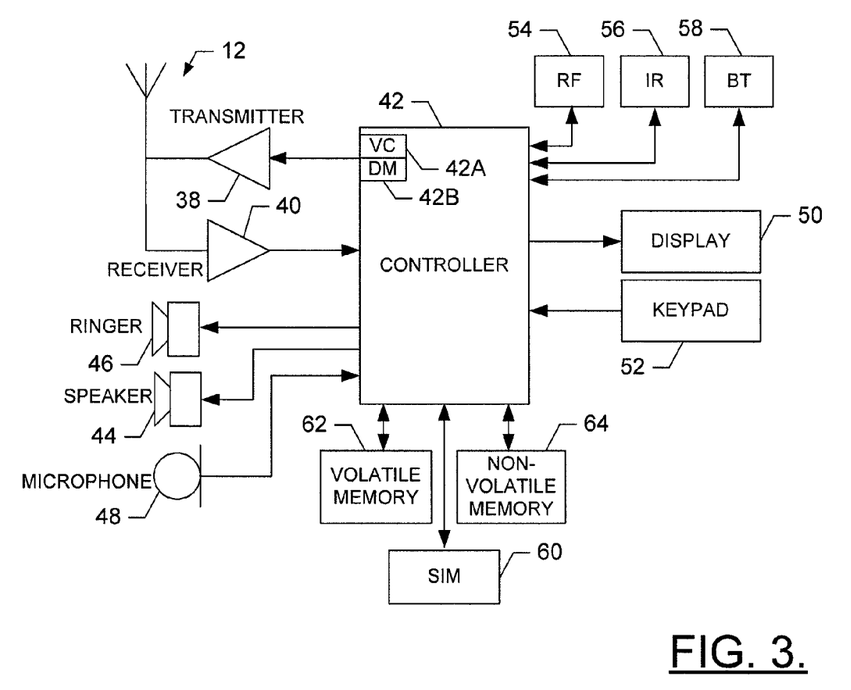
FIG. 3 is a schematic block diagram of a terminal comprising a mobile station, in accordance with one embodiment of the present invention.

Reference is now made to FIG. 3, which illustrates one type of terminal 10 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the terminal 10 includes a transmitter 38, a receiver 40, and a controller 42 that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of first generation (1G), second generation (2G), 2.5G and/or third-generation (3G) communication protocols or the like. For example, the terminal may be capable of operating in accordance with 2G wireless communication protocols IS-136 (TDMA), GSM, and IS-95 (CDMA). Also, for example, the terminal may be capable of operating in accordance with 2.5G wireless communication protocols GPRS, Enhanced Data GSM Environment (EDGE), or the like. Further, for example, the terminal may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 42 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC) 42A, and may include an internal data modem (DM) 42B. Further, the controller may include the functionally to operate one or more software programs, which may be stored in memory (described below). For example, the controller may be capable of operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including a conventional earphone or speaker 44, a ringer 46, a microphone 48, a display 50, and a user input interface, all of which are coupled to the controller 42. The user input interface, which allows the terminal to receive data, can comprise any of a number of devices allowing the terminal to receive data, such as a keypad 52, a touch display (not shown) or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) transceiver or interrogator 54 so that data can be shared with and/or obtained from electronic devices in accordance with RF techniques.

The terminal can additionally, or alternatively, include other short-range transceivers, such as, for example an infrared (IR) transceiver 56, and/or a Bluetooth (BT) transceiver 58 operating using Bluetooth brand wireless technology developed by the Bluetooth Special Interest Group. The terminal can therefore additionally or alternatively be capable of transmitting data to and/or receiving data from electronic devices in accordance with such techniques. Although not shown, the terminal can additionally or alternatively be capable of transmitting and/or receiving data from electronic devices according to a number of different wireless networking techniques, including WLAN techniques such as IEEE 802.11 techniques or the like.

The terminal 10 can further include memory, such as a subscriber identity module (SIM) 60, a removable user identity module (R-UIM) or the like, which typically stores information elements related to a mobile subscriber. In addition to the SIM, the terminal can include other removable and/or fixed memory. In this regard, the terminal can include volatile memory 62, such as volatile Random Access Memory (RAM) including a cache area for the temporary storage of data. The terminal can also include other non-volatile memory 64, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the mobile station, such as to the MSC 16. As explained below, the memories can also store one or more applications capable of operating on the terminal.

As explained in the background section, in various instances a user may desire to access or otherwise view a document through a medium for which the document was not originally designed. For example, a user may desire to view a document through a terminal 10 that may have limited display area, resolution, and rendering capabilities and may be unable to render such documents as they were originally designed, or they may render them in an extremely slow and/or inconvenient manner. Thus, in accordance with embodiments of the present invention, a source (e.g., personal computer) capable of operating in a fixed network environment (e.g., LAN, MAN, WAN, etc.) is capable of reformatting content into a scalable digital printout by means of a printing interface at the source before being provided to a destination (e.g., terminal) capable of operating in a cellular network environment (e.g., TDMA, GSM, CDMA, GPRS, EDGE, MBMS, DVB, CSD, HSCSD, etc.). The digital printout can then be provided to the destination based upon an address of the destination and through a messaging gateway 25, which is capable of interfacing between the fixed network environment and the cellular network environment. Thereafter, the destination can be capable of rendering the content, such as by a display (e.g., display 50). Before providing the digital printout, however, the messaging gateway can notify the destination of the availability of content intended for the destination. The destination can thereafter download the content from the messaging gateway.

Figure 4:
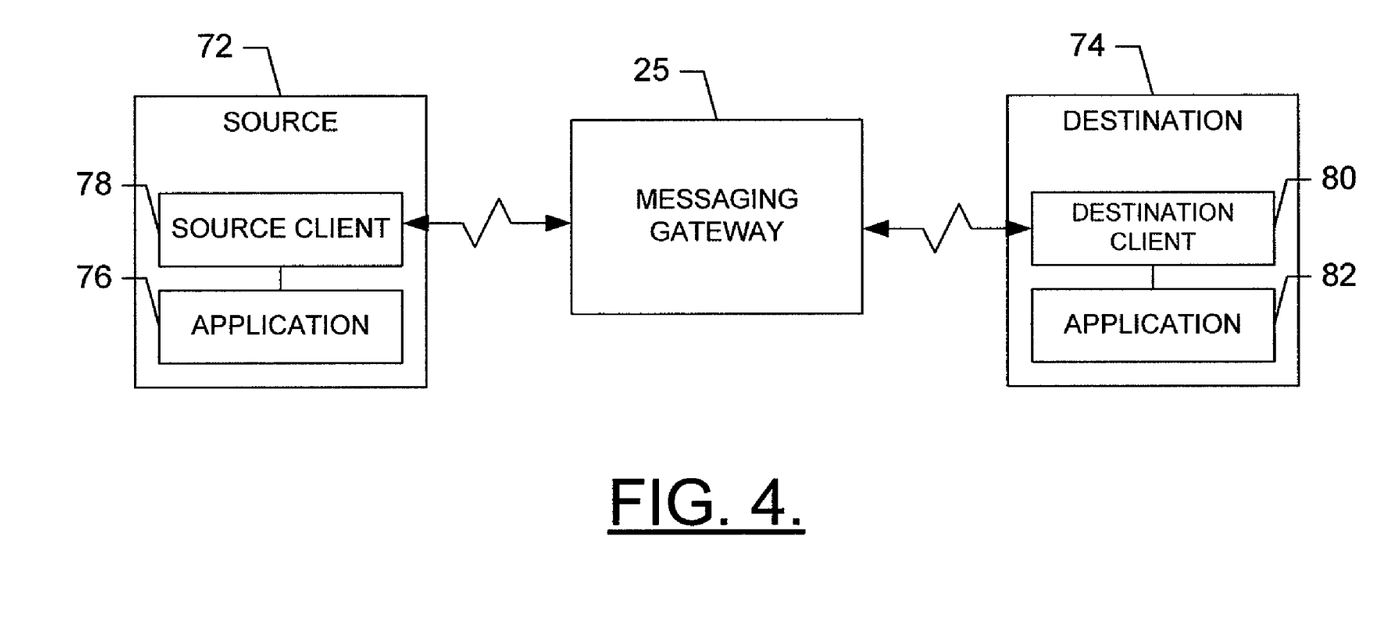
FIG. 4 is a functional block diagram of a source transferring content to a destination via a messaging gateway, in accordance with one embodiment of the present invention.

Reference is now drawn to FIG. 4, which illustrates a functional block diagram of a source 72 of content providing or otherwise transferring one or more pieces of content to a destination 74, where the source is capable of operating in a fixed network environment and the destination is capable of operating in a cellular network environment. As shown, the source is capable of operating an application 76, such as a content viewer and/or editor. The content can comprise any of a number of different types of content including, for example, presentation slides, spreadsheets, clipboard data, images in various graphics formats (e.g., JPG, GIF, BMP, etc.), screenshots, documents and the like. Thus, the content viewer and/or editor can comprise any of a number of different applications capable of rendering the content for display by the source.

To permit the source 72 to transfer content to the destination 74 in accordance with embodiments of the present invention, the source is also capable of operating a source client 78. The source client of one embodiment includes or is otherwise in communication with a printer driver, such as a printer driver configured in accordance with the Microsoft® Windows® operating system. In such an embodiment, the source client is capable of directly interfacing with the printing functionality of the content viewer and/or editor application 76 operating on the source. Briefly, the source client is capable of interfacing with a printing functionality of application 76 to thereby reformat the content into a vectorized format, such as by implementing or otherwise communicating with a graphics filter. The source client can reformat the content into any of a number of different vectorized formats. In one typical embodiment, for example, the source client can reformat the content into a SVG (scalable vector graphics) format or any derivatives of the like (e.g., Mobile SVG, SVG-Tiny, SVG-Basic, etc.). In addition to reformatting the content, the source client can request, and thereafter receive, an address or other identity of the destination such that the vectorized content can be transmitted to the destination based upon the address of the destination.

After reformatting the content and receiving the address of the destination 74, the source client 78 can transfer the reformatted content and destination address to a messaging gateway 25, which is can include an interface between the fixed and cellular networks to interface therebetween. Generally, the messaging gateway handles post-processing of the content and delivery of the content to the destination. If so desired, the messaging gateway can also perform tasks related to user/client authentication, user registration, user account management, transaction logging and billing/collection of source user transaction data. It is also possible to use a web server in the messaging gateway for distributing the source and destination clients 78, 80 to the source 72 and destination, respectively, and for providing tools for user registration and setting up user accounts. As described herein, the source and messaging gateway comprise separate entities. It should be understood, however, that a single entity may support a logically separate, but co-located, source and messaging gateway, without departing from the spirit and scope of the present invention.

More particularly, upon receipt of the reformatted content and destination address at the messaging gateway 25, the messaging gateway can communicate with the destination 74 based upon the address of the destination, to thereby effectuate the transfer of the reformatted content to the destination. In this regard, the destination is capable of operating a destination client 80 capable of communicating with the messaging gateway to receive the reformatted content from the messaging gateway. For example, as explained below, the messaging gateway can send a notice, such as an SMS (short messaging service) message, to the destination client to thereby inform the destination client of the availability of the reformatted content. Thereafter, the destination client can communicate with the messaging gateway to download the reformatted content. Upon downloading the reformatted content, the destination client can be capable of rendering the reformatted content for display by the destination. Alternatively, as shown, the destination client can be capable of communicating with an application 82, such as a content viewer and/or editor, capable of rendering the reformatted content for display by the destination.

As shown and described herein, the source client 78 and destination client 80 each comprise software operated by the source 72 and destination 74, respectively. It should be understood, however, that the source client and/or destination client can alternatively comprise firmware or hardware, without departing from the spirit and scope of the present invention. Also, although the source client and destination client are shown and described as being local to the source and destination, respectively, any one or more of the source client and destination client can alternatively be distributed from, and in communication with, the source and destination, respectively, such as across the Internet 20. Further, as shown and described herein, content is provided or otherwise transferred from a source to a destination. It should be understood, however, that the terms "providing" and "transferring" can be used herein interchangeably, and that providing or transferring content can include, for example, moving or copying content from the source to the destination, without departing from the spirit and scope of the present invention.

The system, method and computer program product of embodiments of the present invention will now be described in more detail with respect to a source 72 providing or otherwise transferring content to a destination 74. As described herein, a source can comprise any entity (e.g., terminal 10, origin server 23, user processor 24, etc.) functioning in accordance with embodiments of the present invention to transfer one or more pieces of content to a destination. The destination, on the other hand, can comprise any entity (e.g., terminal, origin server, user processor, etc.) functioning in accordance with embodiments of the present invention to receive content from the source and thereafter render the content for display, if so desired. As will be further appreciated, although functionally operating in different manners, the same entity can, at different times, function as a source, destination or both a source and a destination.

Figure 5:
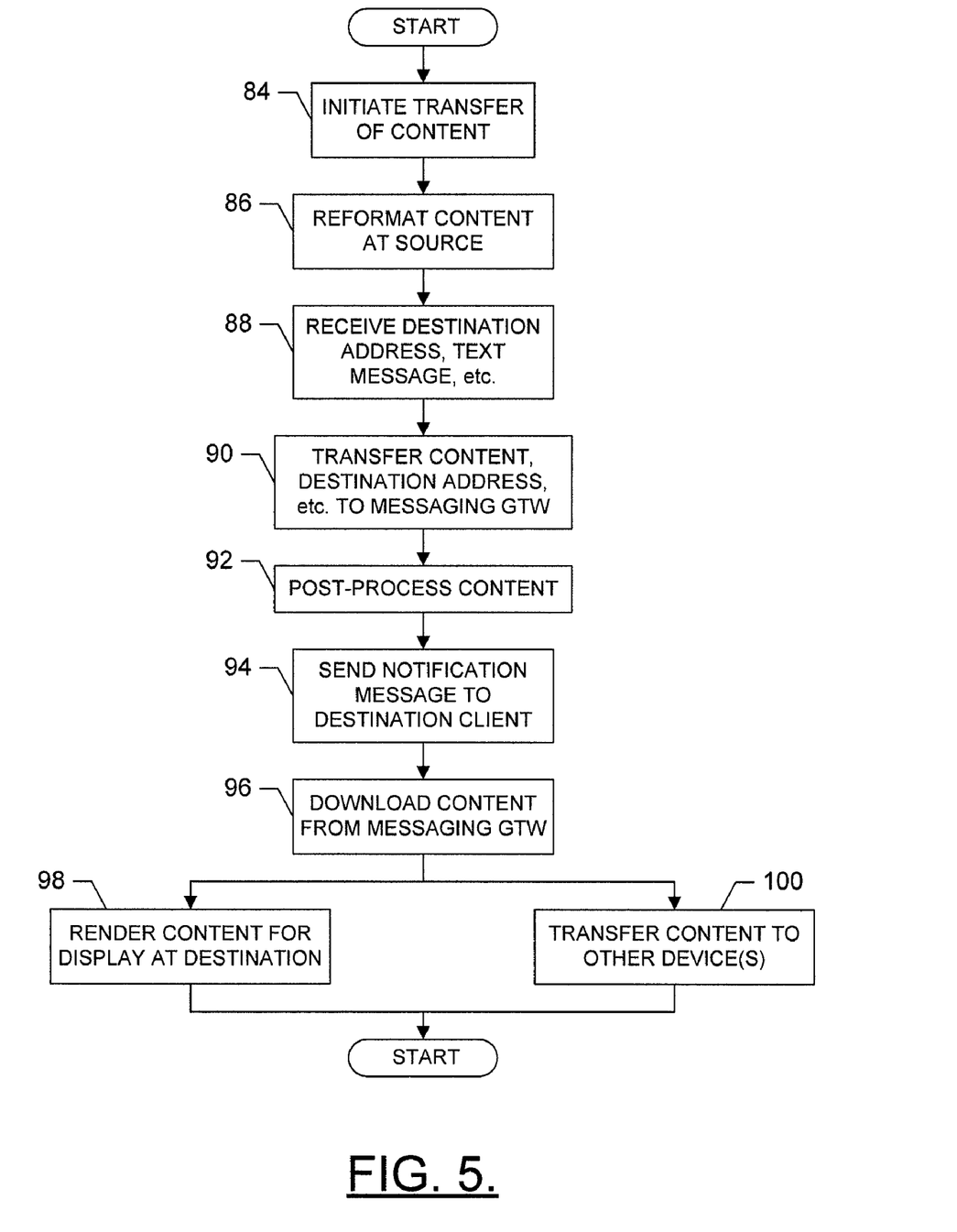
FIG. 5 is a flowchart illustrating various steps in a method of providing content to a destination, such as a terminal, in accordance with one embodiment of the present invention.

Reference is now drawn to FIG. 5, which illustrates a flowchart including various steps in a method of transferring content to a destination, such as a terminal. As shown, when application 76 is rendering content for display or processing content, or has otherwise selected content, at the source 72, the source client 78 can be initiated to initiate transfer the content to a destination 74, as shown in block 84. For example, when application 76 is processing content at the source, a printing function of application 76 can be initiated, such as by a user of the source, with the source client selected as the printer device. Alternatively, in some applications the installation of a printer driver, such as the source client, can cause macro command buttons to be embedded into the application's menu bar, which can directly activate the printing process to the designated printer driver. For example, the printer driver installation can create a command button named "Mobile Recipient" into Microsoft® Office applications (e.g., Word, PowerPoint®, etc.) in the "File/Send To" menu, which can thereafter be used to initiate the source client.

After initiating the source client 78, the source client can reformat the content into a vectorized format, such as the SVG format, or an intermediate format, such as the PostScript format, as shown in block 86. For example, when the source operates in accordance with the Windows® operating system, the source client can interface with the Windows® Graphics Device Interface (GDI), producing a vectorized graphics description file from the printer output of the content from application 76. Alternatively, for example, the source client can produce a graphics description file in an intermediate format, which can thereafter be formatted by the messaging gateway 25 into a vectorized format supported by the destination, as explained below.

Figure 6:
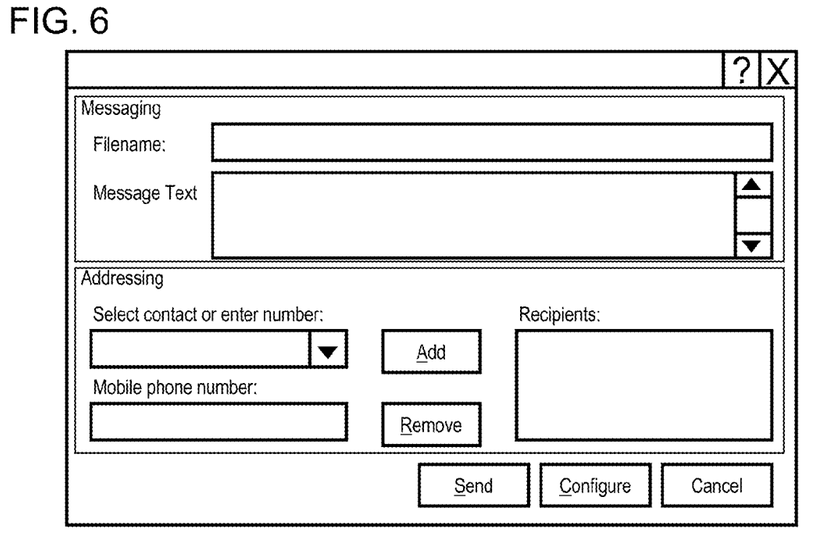
FIG. 6 illustrates a dialog box capable of being presented by a source client in transferring content to a destination, in accordance with one embodiment of the present invention.

Irrespective of the format of the content produced by the source client 78, as shown in block 88, the source client can request, and thereafter receive from a source user, an address (e.g. MSISDN, SIP address, etc.) of the destination 74 of the reformatted content, as well as any of a number of other pieces of information, if so desired. For example, as shown in FIG. 6, the source client can present, on a display of the source, a dialog box requesting the MSISDN of a destination comprising a terminal 10. In addition, the dialog box can receive a text message that can be transferred to the destination along with the reformatted content. As will be appreciated, the destination address can be received in any of a number of different manners. For example, the destination address can be received manually, such as from a source user via a user input interface of the source. Alternatively, the destination address can be selected from a directory (e.g., contacts directory) based upon a user of the destination, for example, where the directory is stored or otherwise accessible by the source.

Figure 7:
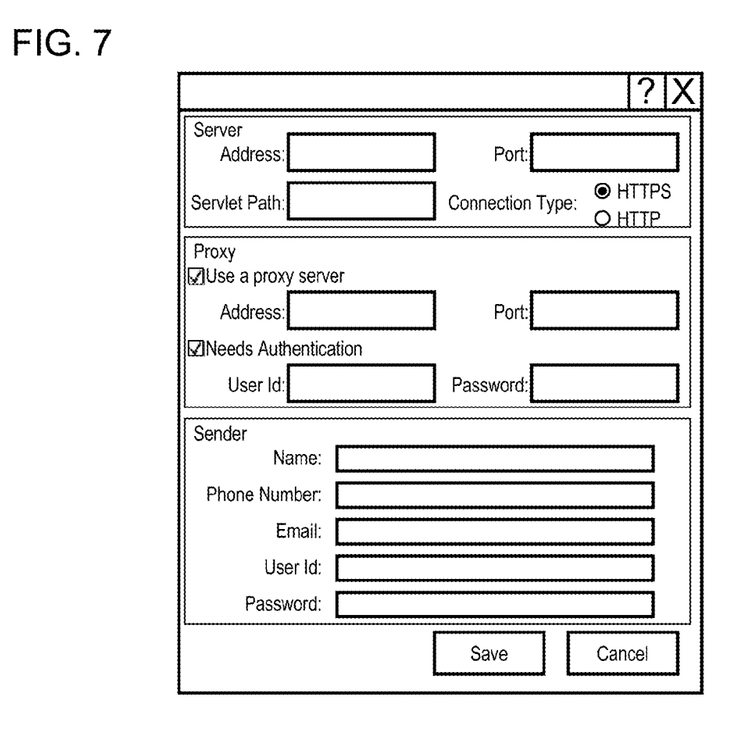
FIG. 7 illustrates a dialog box capable of being presented in configuring a source client for operation to transfer content to a destination, in accordance with one embodiment of the present invention.

If so desired, the source client 78 can also request, and receive, one or more configuration parameters to thereby permit a source user to configure the source client. For example, as shown in FIG. 7, the source client can request, and receive, configuration parameters including an identity or other information relating to the source user, such as the name, phone number and/or e-mail address of the user (one or more identities of the source being referred to as "source user information"). Also, for example, configuration parameters can include an address, and any other locators, parameters and the like of a messaging gateway 25 (e.g., IP address, port number, communication protocol, servlet path, user ID/password to access the messaging gateway, etc.). In addition, if the source communicates with the messaging gateway via a proxy server, such as in instances where firewall restrictions require the user of a proxy server (not shown), the configuration parameters can include an address, and any other locators, parameters and the like of the proxy server (e.g., IP address, port number, user ID/password to access the proxy server, etc.). As will be appreciated, although the source client can receive configuration parameters each time the source client is initiated to transfer content, the source client more typically receives configuration parameters before the first instance of transferring content, and thereafter uses the same configuration parameters (unless altered by the source user) to transfer subsequent pieces of content.

Irrespective of how the source client 78 receives the destination address, and irrespective of how the source client is configured, after reformatting the content and receiving the destination address, the source client can thereafter transfer the reformatted content and destination address (and other information—e.g., source user information, text message, etc.—if included) to the messaging gateway 25 (identified in the configuration parameters), as shown in block 90. Before transferring the content and destination address to the messaging gateway, however, the source client can, if so desired, compress the reformatted content, such as in accordance with the GNU zip technique. Also, when the source client reformats the content into the SVG format, the source client can, if so desired, create an additional (SVG) document including the text message received by the source client (if so received) and source user identity, which can be appended to the SVG formatted content.

To transfer the reformatted content to the messaging gateway 25, the source client 78 can establish communication with the messaging gateway. For example, the source client can establish communication with the messaging gateway in accordance with the communication protocol specified in the configuration parameters. For example, the source client can establish communication with the messaging gateway at least partially over an Internet Protocol (IP) network (e.g., the Internet 22) in accordance with HTTP or HTTPS (HTTP over Secure Sockets Layer). Thereafter, the source client can be authenticated to the messaging gateway, such as for billing and/or account verification purposes. For example, the source client can be authenticated to the messaging gateway in accordance with a user ID/password technique using the user ID/password previously specified in the configuration parameters. Presuming the source client is successfully authenticated to the messaging gateway, the source client can transfer the reformatted content and destination address, as well as any source user information and additional text message, to the messaging gateway. Then, upon receipt of the reformatted content, destination address and other information by the messaging gateway, the communication session between the source client and messaging gateway can be closed. Before closing the communication session, however, the source client can request a delivery receipt from the messaging gateway such that, after the destination 74, or more particularly the destination client 80, receives the content from the messaging gateway (explained below), the messaging gateway sends a notification message to the source client (e.g., via e-mail, SMS message, etc.) to notify the source of the destination's receipt of the content.

After receiving the reformatted content, the messaging gateway 25 can post-process the reformatted content, as shown in block 92. For example, the messaging gateway can uncompress the reformatted content (if previously compressed). Thereafter, in instances in which the reformatted content is in an intermediate format (e.g., PostScript), the messaging gateway can reformat the content from the intermediate format into the vectorized format (e.g., SVG). Irrespective of whether the messaging gateway reformats the content from the intermediate format to the vectorized format, the messaging gateway can also process the content to compress any raster images (e.g., JPG, PNG, BMP, etc.) embedded in the content, to reduce the size of such images, and thus the size of the content. Before compressing such images, however, the messaging gateway can, if so desired, convert the embedded images of various formats to a common format (e.g., JPG) that is supported by the vectorized format. In this regard, in one embodiment, the messaging gateway can set the resolution and compression level of the raster images embedded in the content, as well as set initial SVG "view box" parameters, based upon display and/or memory capabilities of the destination. In this regard, the messaging gateway can maintain a database of such capabilities for a plurality of destinations, such as for those destinations that have registered with the messaging gateway.

After post-processing the reformatted content, the messaging gateway 25 can prepare a header page including, for example, the text message received by the source client 78 (if so received), the source user's identity, as well as the date and/or time of document creation and other transaction information that may be desirable to the destination 74, or more particularly the destination user. The messaging gateway can then embed the header page in the reformatted content. It should be noted that in various instances the vectorized format may not support embedding the header page in the reformatted content or not otherwise support content including multiple pages. For example, the SVG-Tiny format currently does not support pagination with the "Page/PageSet" keywords. Thus, in an alternative embodiment, content pagination can be handled by the destination, or more particularly the destination client 80. In such instances, in lieu of embedding the header page in the reformatted content, the header page can be handled as a separate piece of content from the reformatted content from the source, where each piece of content can identify the order of the respective piece with respect to other pieces of content. Also in such instances, content including multiple printed pages can be divided into multiple reformatted pieces of content, with each piece of reformatted content typically including a single printed page.

After preparing the header page and including the header page with the reformatted content, the messaging gateway 25 can compress the content (or pieces of content) into a single compressed file, which can thereafter be at least temporarily stored in the transaction database (e.g., in memory 39) along with a unique session authentication key, if so desired. Then, the compressed file can be transferred to the destination 74. The messaging gateway can directly push the header page/reformatted content to the destination. As explained below, in a more typical embodiment, however, the messaging gateway signals the destination, or more particularly the destination client 80 to thereby notify the destination client of the availability of reformatted content intended for the destination, such as via a cellular communication channel (e.g., SMS channel) for signaling the destination client. Thereafter, the destination client can establish a data connection to thereby communicate with the messaging gateway to download the reformatted content.

More particularly, after including the header page with the reformatted content, the messaging gateway 25 can determine if the destination has previously registered with the messaging gateway, and includes a destination client, such as by cross matching the address of the destination against the terminal database (e.g., in memory 39) of registered destinations. If the destination has not previously registered with the messaging gateway, the messaging gateway can instruct the destination 74, or more particularly the destination user, as to how (and from where) to download and install a destination client 80 to enable the destination to thereafter download content intended for the destination. The messaging gateway can instruct the destination in any of a number of different manners, but in one embodiment, the messaging gateway instructs the destination by sending a SMS message through a respective SMSC 18 (see FIG. 1) to the destination, where the SMS message includes appropriate instructions. Thereafter, the destination can download and install a destination client in accordance with the instructions, and register with the messaging gateway. In this regard, in registering with the messaging gateway, the destination client can provide the messaging gateway with an identity of the destination and an address of the destination. For example, when the destination comprises a terminal 10, the destination agent can provide the messaging gateway with the IMEI code and MSISDN of the terminal. The messaging gateway can, upon receipt, store the identity and associated address of the destination in the terminal database to thereby ensure that only the proper terminal (identified by the IMEI code) can access content intended for receipt by the terminal from the source, which can indicate the address (e.g., MSISDN) of the terminal.

If the destination 74 has previously registered with the messaging gateway 25, or as or after the destination registers with the messaging gateway, the messaging gateway can signal the destination, or more particularly the destination client 80, to thereby notify the destination client of the availability of content intended for the destination. Although the messaging gateway can signal the destination client in any of a number of different manners, in one embodiment, the messaging gateway signals the destination client by sending an appropriate notification message to the destination client. Whereas the messaging gateway can send a notification message directly to the destination client, in one typical embodiment, the messaging gateway communicates signalling information to a messaging center (e.g., SMSC 18) or other proxy, which is capable of thereafter sending a notification message (e.g., SMS message) to the destination, the notification message including signalling information from the messaging gateway, as shown in block 94. In this regard, the message can include a header portion, which the destination client or other application (e.g., operating system) operating on the destination can identify and process accordingly. For example, for a destination comprising a terminal 10 operating a Symbian brand operating system, the destination client can register with the operating system and request to receive messages, such as SMS messages, having a specific header type. Then, when such a destination receives a notification message, the operating system can identify the header portion of the message, and thereafter launch the destination client to receive the message.

Figure 8:
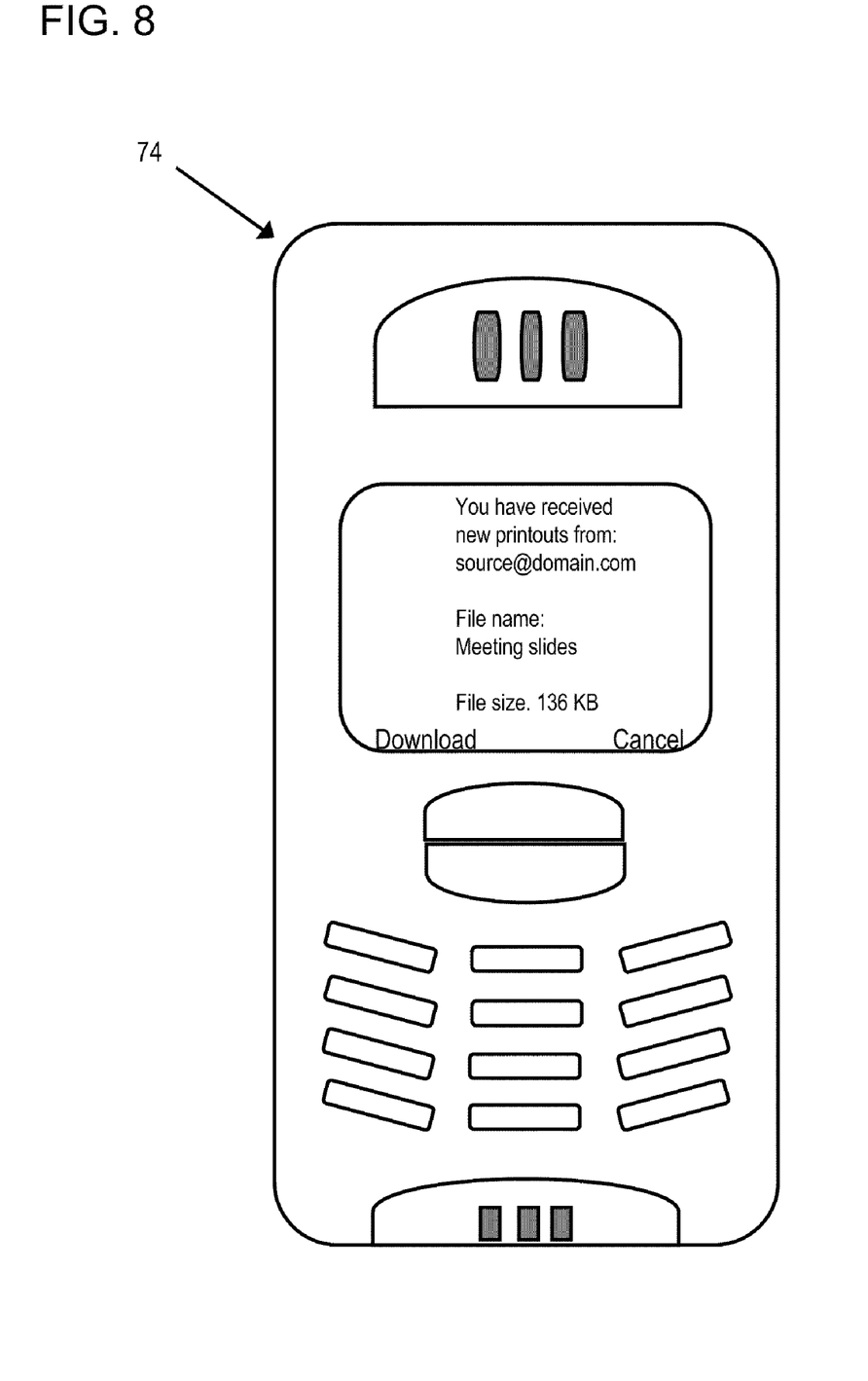
FIG. 8 illustrates a notification message being presented by a destination, the notification message notifying the destination of the availability of content intended for the destination, in accordance with one embodiment of the present invention.

In addition to the header portion, the notification message can identify the reformatted content, and possibly the size of the reformatted content and any other information relevant to the destination 74, destination client 80 or destination user in determining whether to download the reformatted content from the messaging gateway 25. The notification message can also include the address of the messaging gateway, source user information (e.g., name and/or e-mail address). In addition, if so desired, the notification message can include a session authentication key (stored in the transaction database along with the reformatted content and destination address) such that the destination can thereafter be authenticated based upon the session authentication key, as explained below. For example, as shown in FIG. 8, the destination can receive a notification message that the destination client is capable of interpreting and displaying as the following destination user notification: "You have received new printouts from: source@domain.com: File name: Meeting slides: File size: 136 kB." As will be appreciated, the destination user notification can be included within the notification message. Alternatively, the notification message can be configured to include the appropriate signalling information, with the destination client or other messaging application (e.g., application program interface—API) in communication with the destination client, forming an appropriate destination user notification for display to the destination user.

At any point after receiving the notification message from the messaging gateway 25, the destination client 80 of the destination 74 can download the reformatted content from the messaging gateway, as shown in block 96. The destination client can download the reformatted content in accordance with any of a number of different transfer techniques, including any of a number of different cellular (e.g., 1G, 2G, 2.5G, 3G, etc.) communication techniques such as IS-136 (TDMA), GSM, IS-95 (CDMA), GPRS, EDGE, MBMS, DVB (e.g., DVB-T, DVB-H, etc.), CSD (Circuit Switched Data), HSCSD (High-Speed CSD), any of a number of different short range communication techniques such as RF, BT, IrDA, and/or any of a number of different wireless and/or wireline networking techniques such as LAN and/or WLAN techniques. If so desired, in downloading the reformatted content, the destination agent can establish a secure connection, such as a SSL (secure sockets layer) IP connection, with the messaging gateway.

After establishing communication with the messaging gateway 25, the destination client 80 can identify itself to the messaging gateway and, if so desired, authenticate itself to the messaging gateway. For example, when the destination comprises a terminal 10, the destination agent can identify, and thereafter authenticate, the destination using the IMEI code of the terminal. More particularly, after the destination client establishes communication with the messaging gateway, the messaging gateway can request the IMEI code of the terminal, which the messaging gateway can match with the codes of registered destinations stored in the terminal database (e.g., in memory 39). After matching the IMEI code with a code stored in the terminal database, the messaging gateway can fetch the destination address stored in the terminal database associated with the IMEI code also stored in the terminal database. The messaging gateway can search the transaction database to locate a session authentication key and reformatted content stored in the transaction database and associated with the fetched destination address. The messaging gateway can then query the destination agent for the session authentication key sent to the terminal during signaling of the terminal. If the session authentication key thereafter received from the terminal matches the session authentication key located from the transaction database, the destination is authenticated. Otherwise, the destination is not authorized.

Irrespective of how the destination 74 is authenticated to the messaging gateway 25, if the messaging gateway successfully authenticates the destination, the messaging gateway can then retrieve the reformatted content from the transaction database based upon the address of the destination, particularly when the messaging gateway supports transferring content between a plurality of sources 72 and destinations. The destination client 80 can download the reformatted content intended for the destination and, if so desired, store the reformatted content in memory of the destination. Upon receipt of the reformatted content by the destination client, the messaging gateway can, if so desired, delete or otherwise remove the content from the transaction database. In addition, the messaging gateway can, but need not, notify the source, or more particularly the source client 78, of the completed delivery of the content, such as by sending a notification e-mail or SMS message to the source. In addition, as will be appreciated, the messaging gateway can maintain a log of content transfers, which can thereafter be used to create billing information for the source and/or destination based on the content transfer.

After downloading the reformatted content, the content can be utilized in any of a number of different manners. In this regard, the destination client 80 and/or application 82 in communication with the destination client can uncompress the content (if compressed), and render the content for display by the destination, as shown in block 98. For example, when the content is reformatted in the SVG format, and the format permits pagination within SVG content using, for example, Page/PageSet keywords, all of the piece(s) of content can be rendered for display. If the format does not permit pagination, however, each piece of content can be rendered in accordance with the ordering identified by each piece of content with respect to other pieces of content. In such instances, each piece of content is temporarily stored for rendering, with the compressed file including all of the pieces of content maintained in memory of the destination.

Figure 9A:
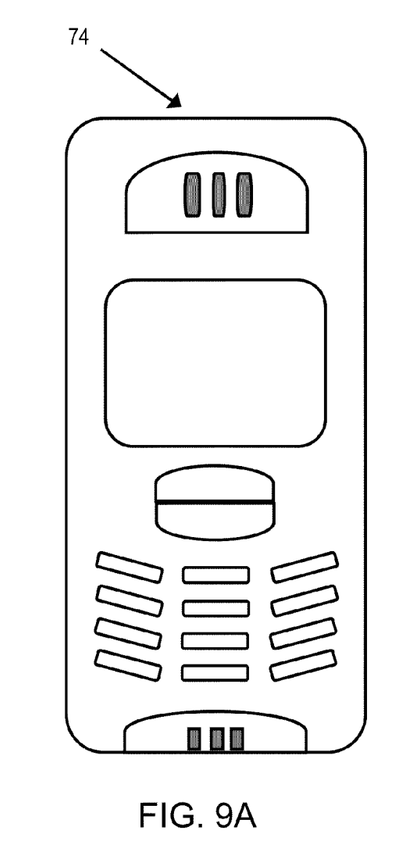
FIGS. 9A, 9B and 9C illustrate different view modes of the display of content at a destination following transfer of the content to the destination, in accordance with one embodiment of the present invention.
Figure 9B:
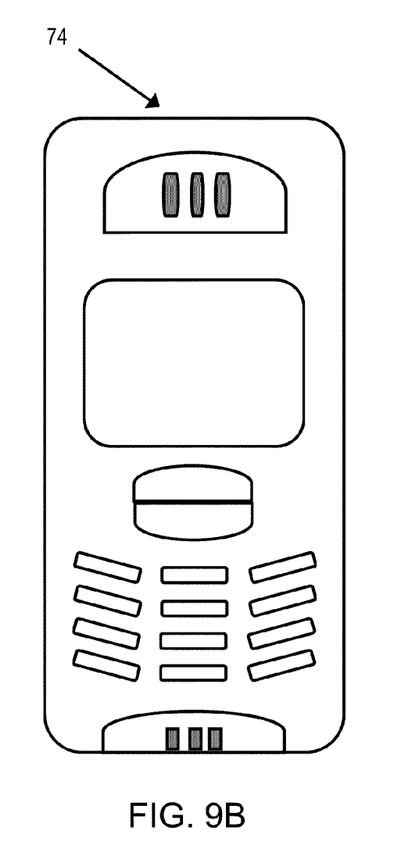
Figure 9C:
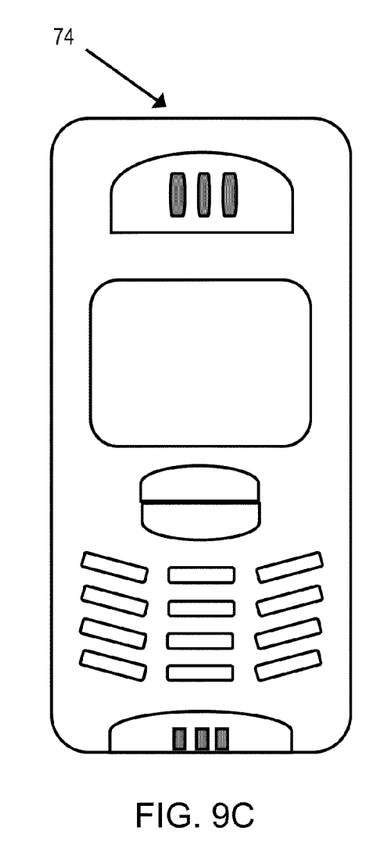

Irrespective of how the destination client 80 and/or application 82 in communication with the destination client renders content for display, the destination client and/or application can receive destination user input to manipulate the rendered content in any of a number of different manners. For example, the destination client and/or application can receive destination user input to scroll within a page of content. The destination client and/or application can also receive destination user input to toggle between different view modes of display of the content. For example, the destination client and/or application can toggle to a whole page view allowing entire page to be displayed, as shown in FIG. 9A. Also, for example, the destination client and/or application can toggle to a zoom view scaling by a specified factor, which can be set by the destination user, as shown in FIG. 9B. In addition, for example, the destination client and/or application can toggle to a text wrap view where only the text content of the document is rendered for display, and wrapped to a display screen width, as shown in FIG. 9C.

In addition to rendering the reformatted content, the destination client 80 and/or application 82 can be capable of transferring the content to one or more other devices, as shown in block 100. For example, the destination client and/or application can be capable of transferring the content to one or more electronic devices 35, such as printers, digital projectors and/or other multimedia capturing, producing and/or storing devices (e.g., other terminals). Like with downloading the content to the destination 74, the destination client and/or application can transfer the content in accordance with any of a number of different transfer techniques, including any of a number of different cellular communication techniques, short range communication techniques, and/or any of a number of different wireless and/or wireline networking techniques. Irrespective of how the destination client and/or application transfers the content, the destination client and/or application can transfer the reformatted content to devices capable of interpreting the format of the content. Alternatively, the destination client and/or application can be capable of again formatting the content in any of a number of different formats capable of being interpreted by the device receiving the content.

As explained above, the messaging gateway 25 is capable of signalling the destination 74 to thereby notify the destination of the availability of content intended for the destination. In response to the being signalled, then, the destination client 82 can be capable of downloading the content. It should be understood, however, that the messaging gateway can be capable of sending, or the destination client can be capable of retrieving, the content without requiring the destination user to respond to a notification message prompting the destination user to download the content. In such instances, the destination client can be configured to operate in the background to initiate communication with the messaging gateway to automatically download the content upon being signalled by the messaging gateway, without requesting permission, or otherwise receiving input, from the destination user. As will be appreciated, such a delivery of content may resemble MMS (Multimedia Messaging Service) delivery, where the destination client downloads the content in the background and alerts the destination user after the content is successfully downloaded to the destination.

As also described herein, content is reformatted by a source 72 and transferred to a messaging gateway 25, which in turn, transfers the content to the destination 74. It should also be understood, however, that the content may alternatively be transferred directly between the source client 78 and destination client 80, without the messaging gateway otherwise handling post-processing and delivery of the content to the destination. For example, the content may be transferred between the source and destination in accordance with the Session Initiation Protocol (SIP). Alternatively, the source client can transfer the content to a messaging gateway, with the messaging gateway sending the notification message, and the destination client downloading the content, in accordance with SIP. In such instances, as will be appreciated, the destination address can comprise a SIP address of the destination.

To illustrate the benefits of embodiments of the present invention, consider the case of a "mobile meeting." In such an instance, consider that a destination 74 comprises a mobile terminal 10 of a mobile user that is away from the user's office and needs to attend a business meeting occurring at the office. In order fully participate in the business meeting, the mobile user needs to be able to share the same meeting material (i.e., content) as the other meeting attendees, who are present at the meeting. Thus, the mobile user asks the meeting organizer at the office to send a digital printout of the material to his mobile terminal. The meeting organizer, operating a personal computer (i.e., source 72) at the office, prints the content using the source client to format the meeting material into a vectorized format (e.g., SVG), which is thereafter sent by the source client to the mobile user's mobile terminal via a gateway 25.

In accordance with one embodiment of the present invention, the meeting organizer can reformat and send the meeting material by printing from the application as usual, but instead of directing the meeting material to a paper printer, the meeting organizer selects the source client 78, which comprises a printer driver. By printing the meeting material to the source client printer driver, the meeting organizer can cause a digital printout of the meeting material to be delivered to the mobile user's mobile terminal 10 in a vectorized format. Thus, after downloading the meeting material, the mobile user can cause the mobile terminal to render the meeting material for display by the mobile terminal, permitting the mobile user to zoom in, scroll and view the meeting material in detail, and in a manner simultaneously with the other meeting participants while participating in a conference call with the other meeting participants.

To further illustrate the benefits of the present invention, consider the case of a "rich call," where shared content can be used to augment a cellular voice call. In this instance, a personal computer (PC) (i.e., source 72) user desires to discuss some subject with a mobile user over the phone, and desires to share some content as a common reference with the mobile user during the phone call. The PC user can operate the PC to print the content using the printer driver source client 78, which allows the PC user to add the addressing information (e.g., mobile phone number) and enter an additional text message to the mobile user. Before transferring the content to the mobile terminal 10 (i.e., destination 74) of the mobile user, the messaging gateway 25 can send a notification message to the mobile user showing the source, size and name of the content available, and prompting the mobile user to download or cancel the operation. After the mobile user has successfully downloaded the content, the messaging gateway can notify the source that the content has been delivered. Upon receipt of the content delivery notification, the source can call the mobile user such that the parties can participate in a phone call while being able to share and reference the common material during the call.

As will be appreciated, in addition to permitting content sharing between source and destination users, embodiments of the present invention can be capable of enhancing "machine-to-man" communication and services. For example, the source client 78 and messaging gateway 25 can be utilized in mobile e-mail services to enable mobile users to access e-mail attachments (i.e., content) by having the attachments "printed" to their terminal (i.e., destination). Also, for example, back-office applications, such as those provided by SAP, Oracle and the like, can be capable of utilizing the source client to "print" documents to mobile terminals (e.g., destinations) when requested by the mobile user.

According to one aspect of the present invention, all or a portion of the system of the present invention, such all or portions of the source 72 and/or destination 74, generally operates under control of a computer program product (e.g., application 76, source client 78, destination client 80, application 82, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 5 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart supports combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   interfacing, via a messaging gateway, a first network environment and a second network environment to receive, from the first network environment, content and addressing information associated with an apparatus within the second network environment, wherein the content is reformatted in a vectorized format; and
   determining to generate a signal specifying access information to access the content.

2. A method of claim 1, further comprising:
   determining to transmit the content to the apparatus in response to a request from the apparatus, the request being generated in response to the signaling.

3. A method of claim 1, wherein the content is in a scalable vector graphics (SVG) format.

4. A method of claim 1, further comprising:
   determining to reformat the content into another vectorized format supported by the apparatus for transmitting the reformatted content to the apparatus.

5. A method of claim 4, further comprising:
   receiving either a text message, a source identification, or a combination thereof; and
   determining to append the reformatted content to the text message, the source identification, or the combination thereof, for transmission to the apparatus.

6. A method of claim 1, wherein the addressing information includes either a mobile telephone number, a session initiation protocol (SIP) address, or a combination thereof.

7. A method according to claim 6, wherein the signaling is in compliance with a short messaging service (SMS), or a session initiation protocol (SIP).

8. A method of claim 1, further comprising:
   determining to authenticate the apparatus based, at least in part, upon the addressing information of the apparatus.

9. A method of claim 8, wherein the apparatus is authenticated based, at least in part, upon an international mobile equipment identification code associated with the apparatus, a session authentication key transferred to the apparatus during the signaling, or a combination thereof.

10. An apparatus comprising:
    at least one processor; and
    at least one memory including computer program code for one or more programs,
    the at least one memory and the computer program code configured to, with the at least one processor, cause the apparatus to perform at least the following,
    interface, via a messaging gateway, a first network environment and a second network environment to receive, from the first network environment, content and addressing information associated with an apparatus associated within the second network environment, wherein the content is reformatted in a vectorized format; and
    determine to generate a signal specifying access information to access the content.

11. An apparatus of claim 10, wherein the apparatus is further caused to:
    determine to transmit the content to the apparatus in response to a request from the apparatus, the request being generated in response to the signaling.

12. An apparatus of claim 10, wherein the content is in a scalable vector graphics (SVG) format.

13. An apparatus of claim 10, wherein the apparatus is further caused to:
    determine to reformat the content into another vectorized format supported by the apparatus, for transmitting the reformatted content to the apparatus.

14. An apparatus of claim 13, wherein the apparatus is further caused to:

receive either a text message, a source identification, or a combination thereof; and determine to append the reformatted content to the text message, the source identification, or the combination thereof, for transmission to the apparatus.

15. An apparatus of claim 10, wherein the addressing information includes either a mobile telephone number, a session initiation protocol (SIP) address, or a combination thereof.

16. An apparatus according to claim 15, wherein the signaling is in compliance with a short messaging service (SMS), or a session initiation protocol (SIP).

17. An apparatus of claim 10, wherein the apparatus is further caused to:

determine to authenticate the apparatus based, at least in part, upon the addressing information of the apparatus.

18. A computer-readable storage medium carrying one or more sequences of one or more instructions which, when executed by one or more processors, cause an apparatus to at least perform the following steps:

interfacing, via a messaging gateway, a first network environment and a second network environment to receive, from the first network environment, content and addressing information associated with an apparatus within the second network environment, wherein the content is reformatted in a vectorized format; and determining to generate a signal specifying access information to access the content.

19. A computer-readable storage medium of claim 18, wherein the apparatus is caused to further perform:

determining to transmit the content to the apparatus in response to a request from the apparatus, the request being generated in response to the signaling.

20. A computer-readable storage medium of claim 18, wherein the content is in a scalable vector graphics (SVG) format.

* * * * *